(12) United States Patent
Nagaraja et al.

(10) Patent No.: US 10,841,149 B2
(45) Date of Patent: Nov. 17, 2020

(54) BEAM FAILURE RECOVERY IN CONNECTION WITH SWITCHING BWP

(71) Applicant: QUALCOMM Incorporated, San Diego, CA (US)

(72) Inventors: Sumeeth Nagaraja, San Diego, CA (US); Yan Zhou, San Diego, CA (US); Tao Luo, San Diego, CA (US); Alexandros Manolakos, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/297,546

(22) Filed: Mar. 8, 2019

(65) Prior Publication Data

US 2019/0319833 A1 Oct. 17, 2019

Related U.S. Application Data

(60) Provisional application No. 62/657,777, filed on Apr. 14, 2018.

(51) Int. Cl.
*H04L 12/24* (2006.01)
*H04W 24/10* (2009.01)
(Continued)

(52) U.S. Cl.
CPC ...... *H04L 41/0668* (2013.01); *H04L 41/0677* (2013.01); *H04W 24/10* (2013.01);
(Continued)

(58) Field of Classification Search
CPC . H04W 76/19; H04W 72/042; H04W 72/046; H04W 72/0413; H04W 72/02;
(Continued)

(56) References Cited

U.S. PATENT DOCUMENTS

2018/0097556 A1 4/2018 Nagaraja et al.
2018/0343653 A1* 11/2018 Guo ..................... H04L 5/0053
(Continued)

FOREIGN PATENT DOCUMENTS

WO 2017000834 A1 1/2017
WO 2018064407 A1 4/2018

OTHER PUBLICATIONS

International Search Report and Written Opinion—PCT/US2019/021659—ISA/EPO—dated May 21, 2019.

*Primary Examiner* — Jung Liu
(74) *Attorney, Agent, or Firm* — Arent Fox LLP

(57) ABSTRACT

A method, a computer-readable medium, and an apparatus are provided for wireless communication at a UE. The apparatus switches from a first, active BWP to a second, active BWP. Then, the apparatus measures a first radio link quality of a configured CORESET TCI or a beam failure detection RS upon switching to the second, active BWP. For example, the apparatus may switch the active BWP based on detecting an expiration of a BWP inactivity timer. The apparatus may then determine based on a threshold radio link quality whether to perform a measurement of a second radio link quality of a beam failure recovery candidate resource set or to continue to monitor the configured CORESET TCI in the second, active BWP.

25 Claims, 9 Drawing Sheets

(51) Int. Cl.
*H04W 28/20* (2009.01)
*H04W 72/04* (2009.01)
*H04W 72/08* (2009.01)
*H04W 74/08* (2009.01)

(52) U.S. Cl.
CPC ......... *H04W 28/20* (2013.01); *H04W 72/046* (2013.01); *H04W 72/085* (2013.01); *H04W 74/0833* (2013.01)

(58) Field of Classification Search
CPC ......... H04W 72/0453; H04W 74/0833; H04W 72/04; H04B 7/08; H04B 7/06; H04B 7/0695; H04B 7/0617; H01M 10/48
See application file for complete search history.

(56) References Cited

U.S. PATENT DOCUMENTS

| | | | | |
|---|---|---|---|---|
| 2019/0173740 A1* | 6/2019 | Zhang | ..................... | H04L 43/08 |
| 2019/0190582 A1* | 6/2019 | Guo | .................... | H04L 25/0226 |
| 2019/0200248 A1* | 6/2019 | Basu Mallick | ...... | H04B 7/0695 |
| 2019/0215048 A1* | 7/2019 | Cirik | .................... | H04B 7/0626 |
| 2019/0215870 A1* | 7/2019 | Babaei | .................. | H04L 5/0092 |
| 2019/0215888 A1* | 7/2019 | Cirik | .................... | H04B 7/0695 |
| 2019/0215897 A1* | 7/2019 | Babaei | .................. | H04W 76/28 |
| 2019/0245737 A1* | 8/2019 | Zhou | ........................ | H04B 7/06 |
| 2019/0246421 A1* | 8/2019 | Zhou | ..................... | H04L 5/0048 |
| 2019/0253941 A1* | 8/2019 | Cirik | ................. | H04W 36/0069 |
| 2019/0253949 A1* | 8/2019 | Park | ..................... | H04B 7/0695 |
| 2019/0253966 A1* | 8/2019 | Park | ........................ | H04W 8/24 |
| 2019/0253986 A1* | 8/2019 | Jeon | ..................... | H04B 7/0695 |
| 2019/0254042 A1* | 8/2019 | Cirik | ..................... | H04L 5/0048 |
| 2019/0261425 A1* | 8/2019 | Park | ..................... | H04W 68/005 |
| 2019/0306765 A1* | 10/2019 | Cirik | ................. | H04W 36/0079 |
| 2019/0306842 A1* | 10/2019 | Cirik | ................. | H04W 72/0413 |
| 2019/0306848 A1* | 10/2019 | Zhou | ................. | H04W 72/0406 |
| 2019/0306867 A1* | 10/2019 | Cirik | ..................... | H04L 5/0023 |
| 2019/0306875 A1* | 10/2019 | Zhou | ..................... | H04B 7/0695 |
| 2019/0306909 A1* | 10/2019 | Zhou | ..................... | H04W 76/19 |

\* cited by examiner

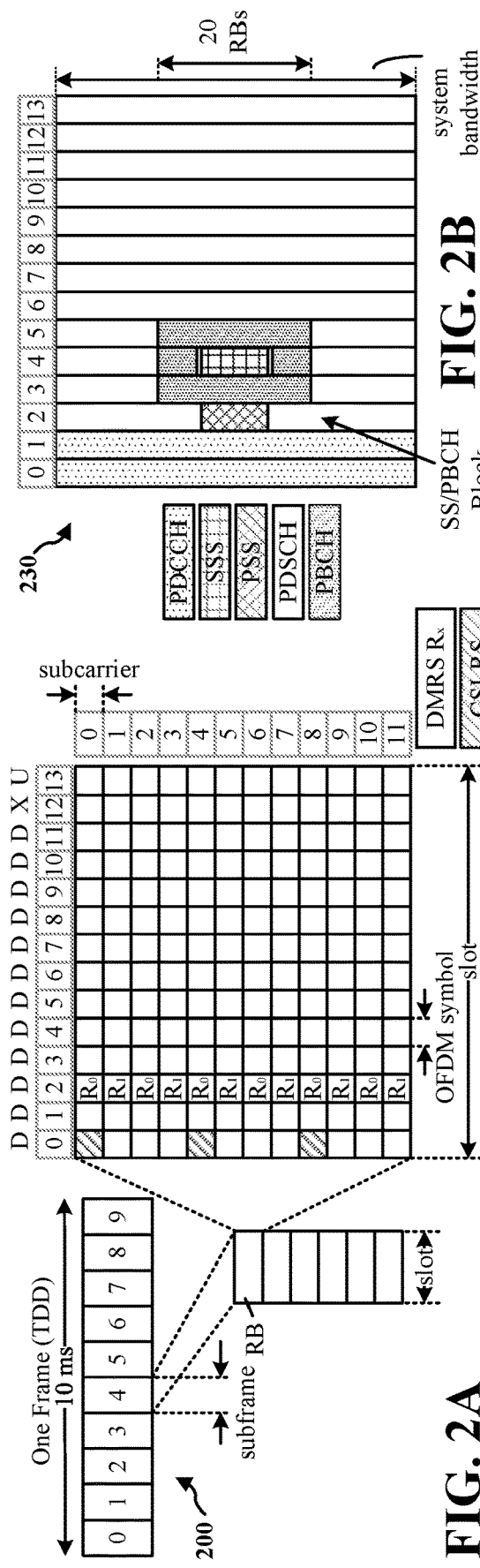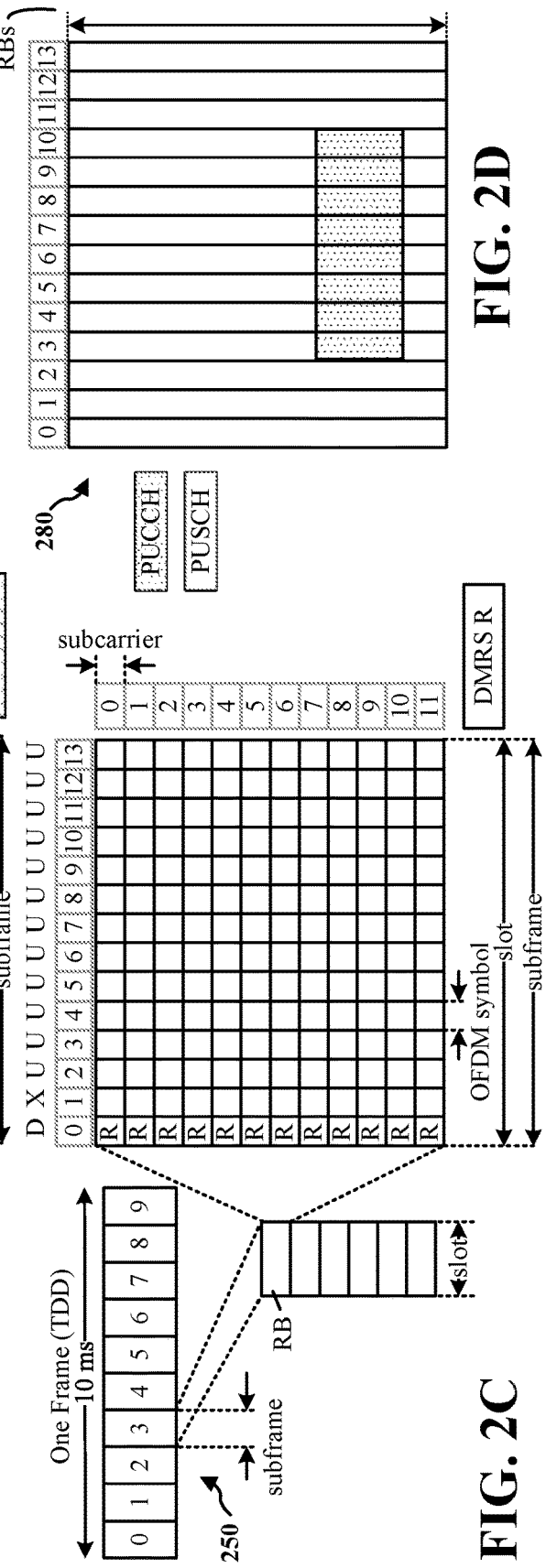

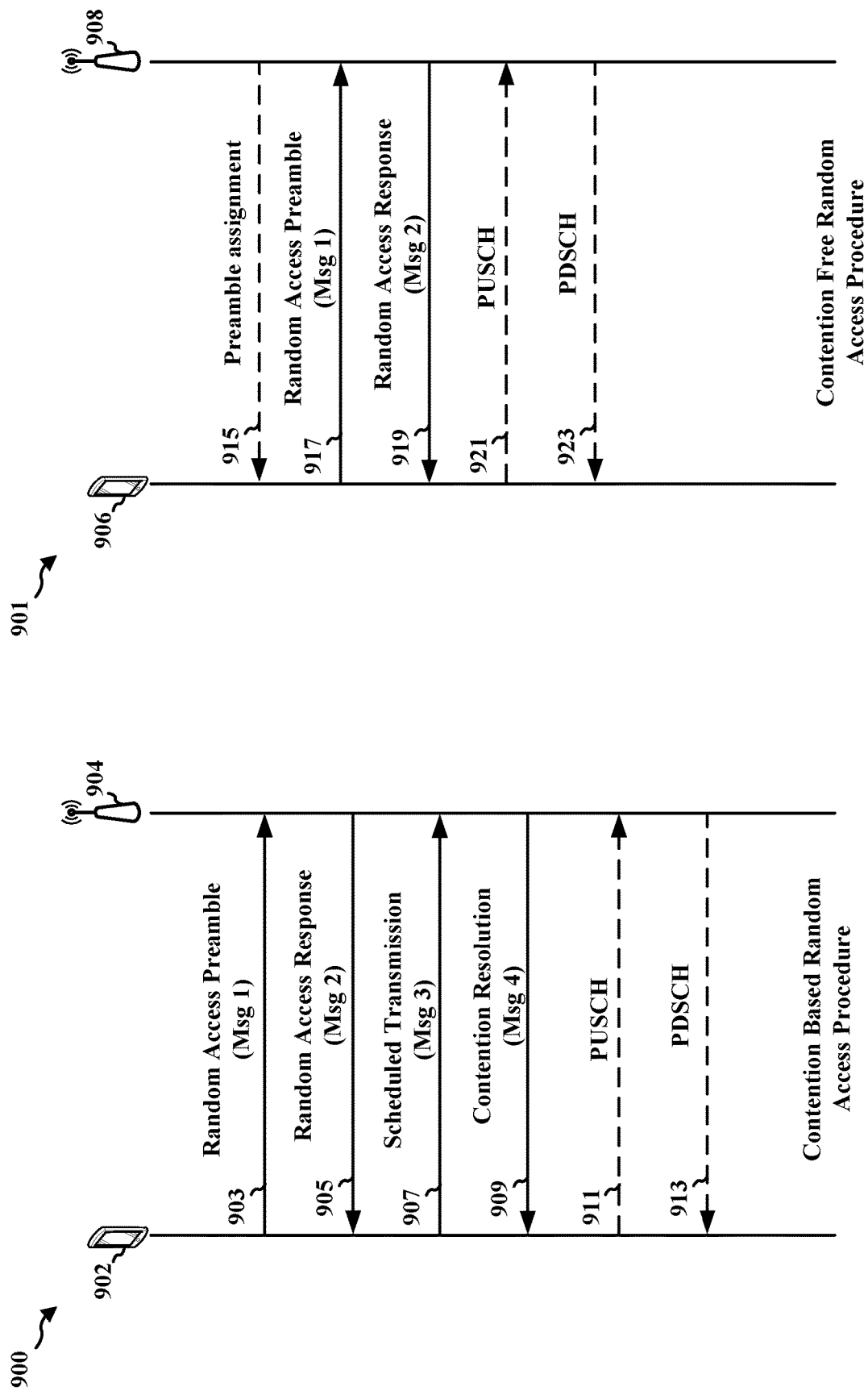

BEAM FAILURE RECOVERY IN CONNECTION WITH SWITCHING BWP

CROSS REFERENCE TO RELATED APPLICATION(S)

This application claims the benefit of U.S. Provisional Application Ser. No. 62/657,777, entitled "Beam Failure Recovery in Connection with Switching BWP" and filed on Apr. 14, 2018, which is expressly incorporated by reference herein in its entirety.

BACKGROUND

Technical Field

The present disclosure relates generally to communication systems, and more particularly, to communication including bandwidth part (BWP) switching.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a User Equipment (UE). The apparatus switches from a first, active Bandwidth Part (BWP) to a second, active BWP. Then, the apparatus measures a first radio link quality of a configured Control-resource set (CORESET) Transmission Configuration Indicator (TCI) or a beam failure detection Reference Signal (RS) upon switching to the second, active BWP. For example, the apparatus may switch the active BWP based on detecting an expiration of a BWP inactivity timer. The apparatus may then determine based on a threshold radio link quality whether to perform a measurement of a second radio link quality of a beam failure recovery candidate resource set or to continue to monitor the configured CORESET TCI in the second, active BWP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 9A illustrates aspects of an example contention based random access procedure.

FIG. 9B illustrates aspects of an example contention free random access procedure.

DETAILED DESCRIPTION

Figure 1:
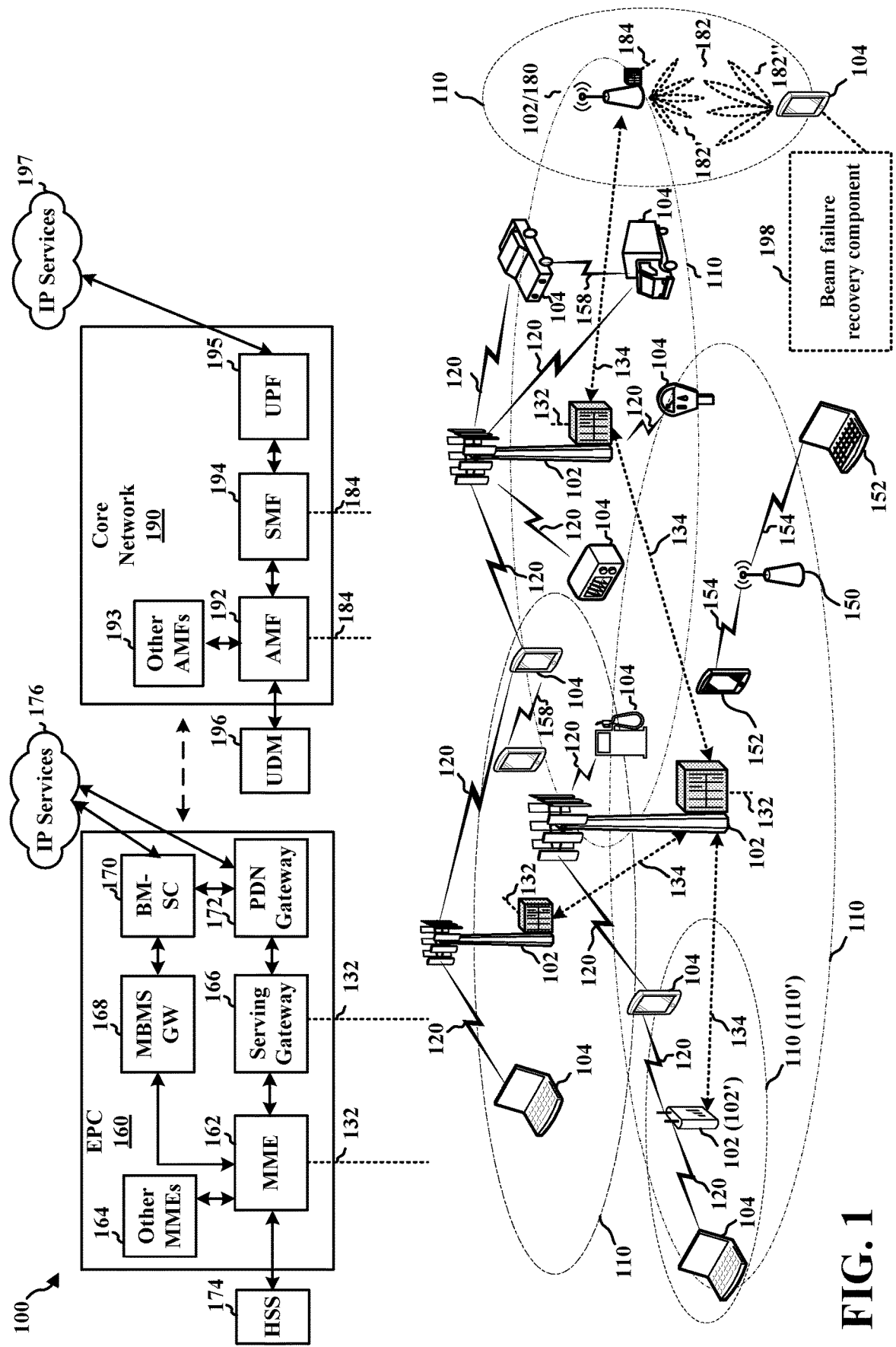
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise a beam failure recovery component 198 that is configured to measure a first radio link quality of a configured CORESET TCI or a beam failure detection RS upon switching from a first, active BWP to a second, active BW (e.g., based on detecting an expiration of a BWP inactivity timer). The beam failure recovery component 198 may be configured to determine based on a threshold radio link quality whether to perform a measurement of a second radio link quality of a beam failure recovery candidate resource set or to continue to monitor the configured CORESET TCI in the second, active BWP. Similarly, the base station may be configured to configure the UE with a different set of values that the UE should use to transmit a BFR request to the network. Although the following description may be focused on examples for 5G NR, the concepts described herein may be applicable to other similar areas and other wireless technologies FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\rho$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
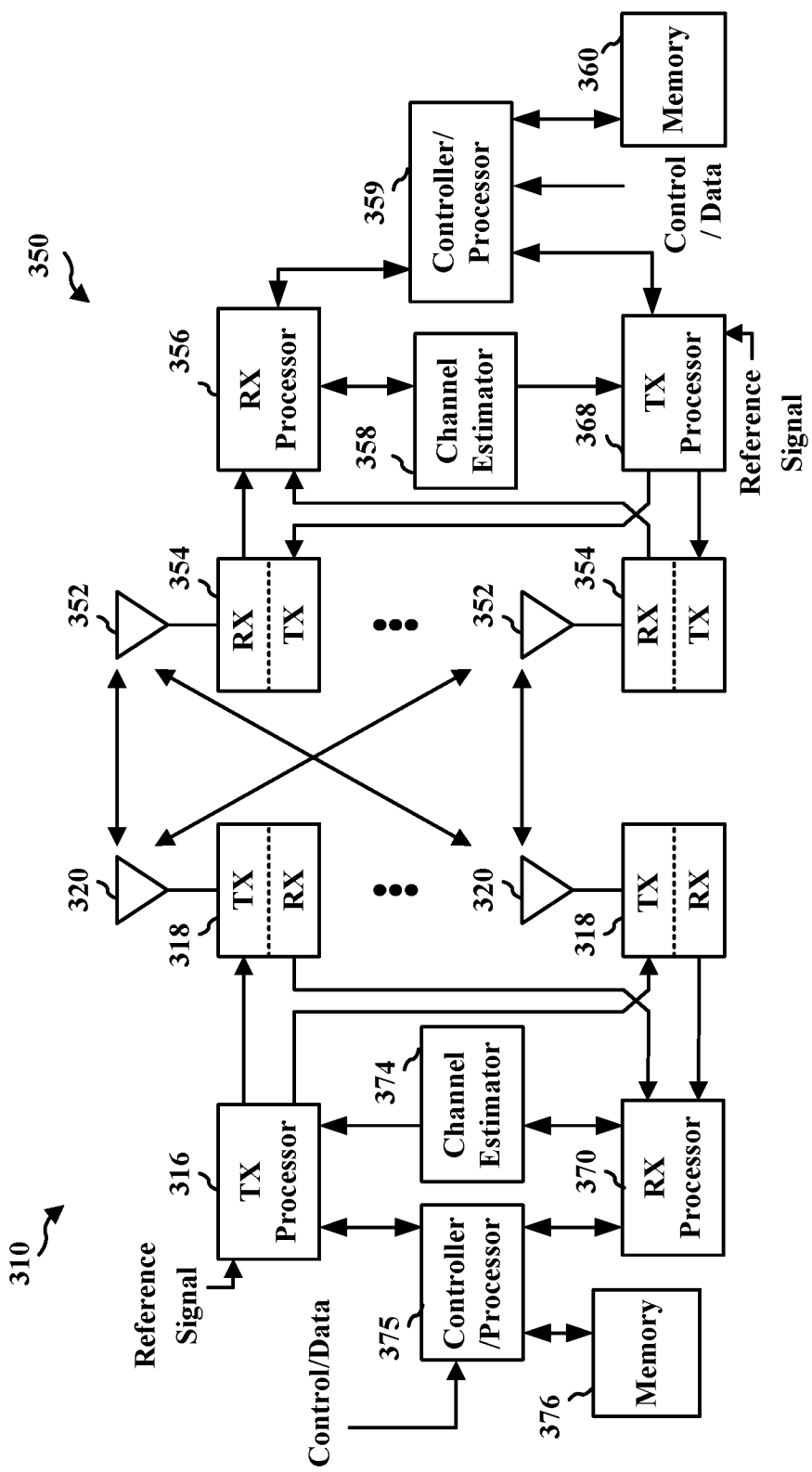
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Radio Link Monitoring (RLM) and/or Beam recovery procedure (BRF) may be used to track radio link conditions. The RLM and/or BRF procedure may indicate whether a link for a particular beam is in-sync or out-of-sync. For monitoring active link performances, a UE may perform measurements of at least one signal, e.g., reference signal(s), for RLM and beam recovery. The measurements may include deriving a metric similar to a Signal to Interference plus Noise Ratio (SINR) for the signal, or RSRP strength or block error rate (BLER) of a reference control channel chosen by a base station (such as a gNB) and/or implicitly derived by the UE based on the existing RRC configuration. The reference signal(s) may comprise any of CSI-RS, a PBCH (e.g., a New Radio-PBCH (NR-PBCH)), an SSS (e.g., a New Radio-SSS (NR-SSS)) PSS (e.g., New Radio-PSS (NR-PSS)), or other reference signals for time and/or frequency tracking, etc. The UE may monitor the reference signal(s) and determine the signal quality, e.g., Reference Signal Received Power (RSRP) for the reference signal and/or in some case, a configured metric such as BLER for a reference control channel. The measurement may correspond to the UE's ability to decode a transmission, e.g., a DL control transmission from the base station.

Thresholds may be defined in tracking the radio link conditions. For example, a threshold may correspond to a block error rate (BLER) that indicates an in-sync condition and/or an out-of-sync condition of the radio link.

An RLM and/or BFR procedure may comprise two types of conditions, e.g., "out-of-sync" indicating that the radio link condition is poor and "in-sync" indicating that the radio link condition is acceptable, and the UE is likely to receive a transmission transmitted on the radio link. An Out-of-Sync condition may be declared when a block error rate for the radio link falls below a threshold over a specified time interval, e.g., a 200 ms time interval. An in-sync condition may be declared when a block error rate for the radio link is better than a threshold over a second, specified time interval, e.g., over 100 ms time interval. The thresholds and time intervals used to determine the in-sync condition and out-of-sync condition may be the same or may be different from each other.

If the UE receives a threshold number of consecutive out-of-sync measurements over a period of time, the UE may declare a radio link failure (RLF) or beam failure. Radio link failure may be based on in-sync or out-of-sync indications as an input from lower layers.

When an RLF and/or BFR is detected, a UE may take appropriate actions to recover the connection. For example, after multiple out-of-sync measurements, the UE may transmit a beam failure recovery signal to initiate recovery of the connection with the base station. For example, the UE may be configured by RRC with a beam failure recovery procedure that is used to indicate to the base station that the RLF has been detected.

As described in connection with FIG. 1, the base station 102/180 and UE 104 may communicate over active data/control beams both for DL communication and UL communication. The base station and/or UE may switch to a new beam direction using beam management or beam failure recovery procedures.

Figure 4:
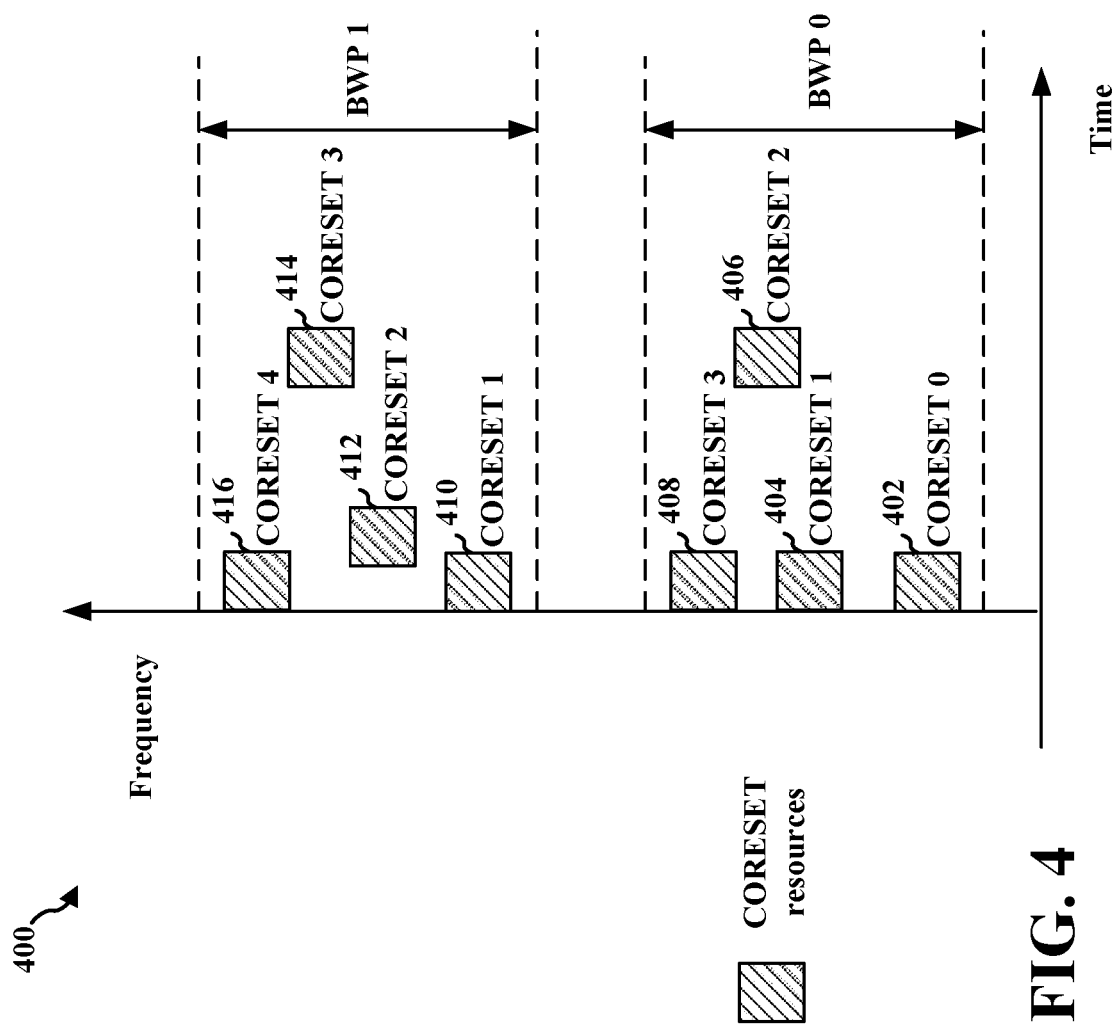
FIG. 4 is a diagram illustrating examples of CORESET resources.

A UE may also be configured for operation in a set of BWPs of a serving cell, e.g., a primary cell and/or a secondary cell. The configuration may include a set of BWPs for the reception of downlink communication from the base station (a DL BWP set) in a DL bandwidth. FIG. 4 illustrates an example 400 showing multiple bandwidth parts (e.g., BWP 0 and BWP 1) for which the UE may be configured. Although two BWPs are illustrated in FIG. 4, the UE may have more than two configured BWPs. As an example, the UE may be configured with four DL BWPs. Similarly, the configuration may include a set of BWPs for transmissions by the UE (UL BWP set) in an UL bandwidth for the serving cell. A UE may receive PDCCH and PDSCH in a configured DL BWP according to a configured subcarrier spacing and CP length for the DL BWP. A UE may transmit PUCCH and PUSCH in a configured UL BWP according to a configured subcarrier spacing and CP length for the UL BWP. Although a UE may be configured with multiple DL BWPs, only a single DL BWP might be active at any given time. Specifically, the UE may use the active BWP from among the configured BWPs for the UE to transmit uplink data, transmit RACH, monitor PDCCH, transmit PUCCH, transmit SRS, receive DL data, etc. The UE may refrain from performing such communication on the other inactive BWPs from among the BWPs configured for the UE. Similarly, the UE might only perform RLM for an active BWP.

An initial active DL BWP may be defined by, e.g., a location and number of contiguous PRBs, a subcarrier spacing, and a cyclic prefix, for the control resource set for Type0-PDCCH common search space. For operation on the primary cell, a UE may be provided with an indication of an initial active UL BWP for a random access procedure. If the UE is configured with a secondary carrier on the primary cell, the UE can be configured with an initial BWP for random access procedure on the secondary carrier. An indication may also be provided to the UE to indicate an active DL BWP and/or active UL BWP. For each DL BWP in a set of DL BWPs on the primary cell, a UE can be configured CORESETs, e.g., for types of common search space and for UE-specific search space. For example, a UE may be configured with CORESET 0 402, CORESET 1 404, CORESET 2 406, and CORESET 3 408 for a first BWP (e.g., BWP 0) and may be configured with a different set of CORESETs (e.g., CORESET 1 410, CORESET 2 412, CORESET 3 414, and CORESET 4 416) for a second BWP (e.g., BWP 1).

A CORESET corresponds to a set of physical resources in time and frequency that a UE uses to monitor for PDCCH/DCI. Each CORESET comprises a one or more resource blocks in the frequency domain and one or more symbols in the time domain. As an example, a CORESET might comprise multiple RBs in the frequency domain and 1, 2, or 3 contiguous symbols in the time domain. A Resource Element (RE) is a unit indicating one subcarrier in frequency over a single symbol in time. A Control Channel Element (CCE) consists of 6 Resource Element Groups (REGs) in which an REG equals one RB (e.g., 12 REs) during one OFDM symbol. REGs within a CORESET may be numbered in increasing order in a time-first manner, starting with 0 for the first OFDM symbol and the lowest-numbered resource block in the control resource set. A UE can be configured with multiple CORESETs, each CORESET being associated with one CCE-to-REG mapping. The CCE-to-REG mapping may be interleaved or non-interleaved.

Parameters for a CORESET may be provided by higher layer parameters, e.g., via an RRC parameter. Among others, such CORESET parameters may indicate a duration parameter indicating a length in time, a frequency domain resource parameter, a parameter indicating whether a CCE-to-REG mapping is interleaved or non-interleaved, and/or a REG bundle size comprising a number of REGs, an aggregation level indicating an amount of CCEs allocated for PDCCH, etc.

Each CORESET may be identified using a CORESET ID. A common CORESET that is not UE specific, e.g., being configured via a MIB, may be indicated as CORESET 0. CORESET 0 may correspond to an initial BWP, a default BWP, etc. CORESETs configured in dedicated signaling for the UE may be identified beginning with CORESET 1, CORESET 2, and so forth.

Each configured CORESET will have an associated TCI. The TCI may be the same or may be different for different CORESETs. A TCI state may include Quasi co-location (QCL) information that the UE can use to derive timing/ frequency error and/or transmission/reception spatial filtering for transmitting/receiving a signal. A TCI state may be indicated, e.g., over DCI, a transmission configuration that indicates QCL relationships between one signal and the signal to be transmitted/received. For example, a TCI state may indicate a QCL relationship between DL RSs in one RS set and PDCCH DM-RS ports. TCI states can provide information about different beam selections. Thus, a CORESET may be associated with a beam as indicated by the associated TCI state.

An active cell may be indicated to the UE by RRC signalling or PDCCH (e.g., DCI). The UE may monitor a set of PDCCH candidates in one or more CORESETs on the active DL BWP on each activated serving cell configured with PDCCH monitoring according to corresponding search space sets. Monitoring for PDCCH may correspond to attempting to decode PDCCH candidate(s). A UE may be provided with a default DL BWP from among the configured DL BWPs, or may use an initial BWP, as the active DL BWP. A serving cell may activate an inactive BWP and deactivate an active BWP, e.g., switching the active BWP for a UE from the default/initial BWP to a different BWP. Thus, the UE may switch BWP based on a PDCCH indicating a downlink assignment or an uplink grant from the base station. As another example, the UE may switch BWP based on a timer. For example, a UE may be provided with an inactivity timer relating to BWP, (e.g., a bandwidthPartInactivityTimer). The UE may decrement the timer at the end of a subframe or the end of a half subframe if a restarting condition is not met during the time interval of the subframe/half subframe. For example, a timer may run when the UE does not detect communication from the base station on the indicated BWP during a time interval. If a BWP inactivity timer expires without detecting communication from the base station on the active BWP, the UE may switch to a different active BWP. For example, the UE may switch from the BWP indicated by the base station to an initial BWP, a default BWP, etc. As yet another example, the UE may switch BWP based on initiation of a Random Access procedure. Thus, if the MAC entity receives an indication for BWP switching from the serving cell, the UE may switch to the indicated BWP, e.g., if there is no ongoing RACH procedure. As well, A challenge may arise when a UE switches between BWPs. In the example in FIG. 4, BWP 0 may initially be the active BWP for the UE, e.g., an initial BWP or default BWP. The base station may instruct the UE to switch to a different BWP (e.g., BWP 1) from among a configured set of BWPs for the UE. The UE will switch to use BWP 1 as the active BWP for UL and/or DL communication from the base station in response to the instruction from the base station. Thus, BWP 0 will become an inactive BWP for the UE. The UE will not use BWP 0 for DL/UL communication and will not perform RLM for inactive BWP 0.

A circumstance may cause the UE to switch back to BWP 0. For example, the UE might not receive communication from the base station within the time period of a BWP inactivity timer or may need to perform a RACH procedure. Upon the expiration of the BWP inactivity timer, for example, the UE may fallback to BWP 0. However, the beams that were configured for CORESET 0 for BWP 0 (which is not a CORESET configured for BWP 1) may no longer be valid due to blockage, movement of the UE, etc. Thus, the UE may need to perform a beam failure recovery procedure in order to re-establish a link with the base station. As described in connection with RLM and or BFR, a UE will first need to determine multiple out-of-sync measurements/determinations in order to determine radio link failure for CORESET 0 for BWP 0. Then, the UE may transmit a beam failure recovery signal to initiate recovery of the connection with the base station. The determination of a radio link failure and initiation of beam failure recovery is a time consuming procedure that involves multiple failure instances, e.g., from the Physical layer to the MAC layer. The process may require measuring and identifying candidate beams, sending a request over CFRA (e.g., msg 1, msg 2) or CBRA (e.g., msg 1, msg 2, msg 3, msg 4) and waiting for a response from the network. This time consuming process can introduce inefficiency in communication between the UE and the base station.

The present application provides aspects that improve the efficiency and accuracy of communication between the UE and the base station when the UE switches between BWPs, e.g., when the UE switches from BWP 1 to BWP 0. Fast signaling between a UE and a base station (e.g., gNB) is provided to establish or re-establish a communication link between the UE and a base station when a BWP switching event happens. The establishing/re-establishing a link may be accomplished through a beam recovery procedure with previously configured parameters or with modified parameters that are specifically targeted for events such as BWP switching. The BWP switching event may be triggered by a timer configured by a base station to an UE such that, when the timer expires, the UE autonomously falls back to a default BWP or to a BWP specified by the base station, e.g., through RRC signaling. The aspects presented herein may also apply to the situation in which a base station uses RRC signaling and/or a control channel to cause the UE to switch BWPs from one to another.

Upon switching (e.g., falling back) from BWP 1 to BWP 0, the UE may check a Radio Link Quality (RLQ) of a configured CORESET TCI for the BWP 0 and/or may check the RLQ of beam failure detection RS resources. Depending on whether the RLQ meets a threshold the UE determines whether to continue to monitor the CORESET for BWP 0 or to perform RLQ measurement of a beam failure recovery candidate resource set and random access on candidate beam(s).

Figure 5:
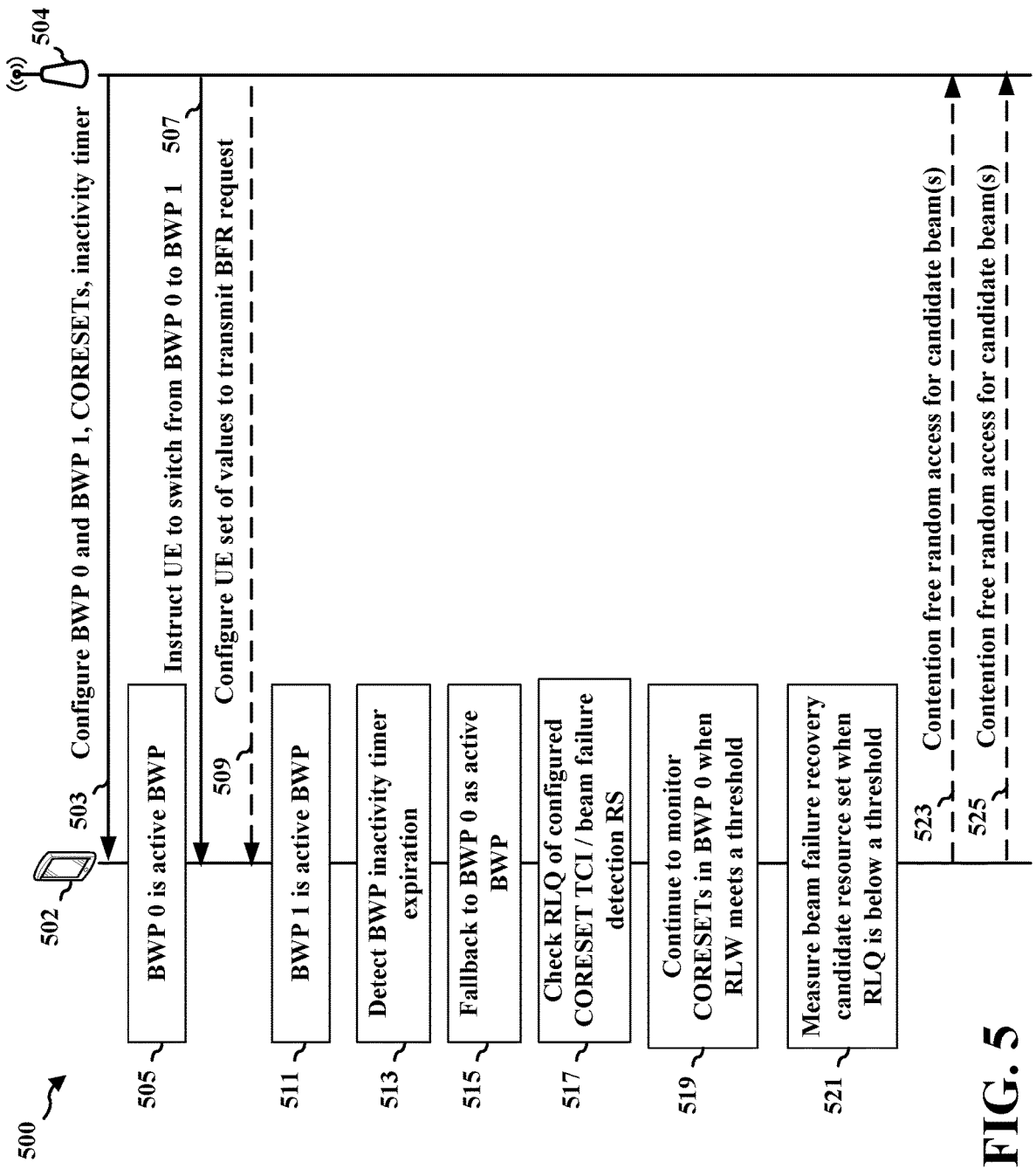
FIG. 5 illustrates an example communication flow between a UE and a base station in connection with switching BWPs.

FIG. 5 illustrates example communication 500 between a UE 502 (e.g., 104, 350, 404, the apparatus 702, 702') and base station 504 (e.g., 102, 180, 310, 402, 750). The base station may configure, at 503, the UE with a set of BWPs including BWP 0 and BWP 1, e.g., as described in connection with the example of FIG. 4. The base station may configure the UE with CORESETs and TCI for each of the configured BWPs. For example, BWP 0 may be configured with CORESETs 0, 1, 2, and 3 while BWP has CORESETs 1, 2, 3, and 4. The base station may also configure the UE with a BWP inactivity timer value related to BWP.

At 505, the UE 502 may have BWP 0 as the active BWP for DL and/or UL communication. The base station may instruct the UE to switch from BWP 0 to BWP 1 at 507. Upon receiving the instruction 507, the UE may switch to BWP 1 as the active BWP at 511 and BWP will transition to inactive.

At 513, the UE may determine an expiration of the BWP inactivity timer, e.g., based on not receiving communication from the base station on BWP 1 over the duration of the configured BWP inactivity timer value. Upon expiration of the timer, the UE falls back to BWP 0 as the active BWP at 515.

Upon switching from BWP 1 to BWP 0 at 515, the UE checks a Radio Link Quality (RLQ) of a configured CORESET TCI for the BWP 0 and/or may check the RLQ of beam failure detection RS resources (e.g., any of NR-SS, NR-PBCH, CSI-RS, etc.) for BWP 0 at 517. At 517, the UE may determine a BLER or RSRP for the CORESET TCI or beam failure detection RS for the BWP in order to determine the RLQ. Depending on whether the RLQ meets a threshold the UE determines whether to continue to monitor the CORESET for BWP 0 or to perform RLQ measurement of a beam failure recovery candidate resource set.

If the RLQ of the configured CORESET TCI and/or beam failure detection RS meets the threshold (e.g., the BLER is at or below a threshold or the RSRP is at or above a threshold), the UE will continue, at 519, to monitor the CORESET, e.g., CORESET 0 TCI, and possible others in BWP 0.

However, when the RLQ measured at 517 does not meet the threshold (e.g., the BLER is at or above the threshold or the RSRP is at or below the threshold), the UE performs RLW measurement of a beam failure recovery candidate resource set at 521. The RLW of the beams in the candidate resource set, as measured at 521 may be compared to a threshold. The threshold may be configured by the network and may be different than the threshold to which the RLQ measured at 517 is compared. Furthermore, other parameters associated with RLF and/or BFR may be configured differently such that UE can quickly determine the link quality and indicate it to gNB of one or multiple suitable links. If the RLQ of beams in the candidate resource set meets the threshold, then the UE performs contention free random access on one or more of the candidate beams at 523, e.g., as described in connection with the example of FIG. 9B. If the RLQ of beams in the candidate resource set do not meet the threshold, then the UE performs contention-based free random access on one or more of the candidate beams at 525, e.g., as described in connection with the example of FIG. 9A.

As illustrated at 509, the base station may also configure, or preconfigure, the UE with a set of values for the UE to use in transmitting BFR requests to the base station. As another example, the UE may shorten a timer and/or a number of instances of beam failure instances to be determined for BWP 0 before initiating a procedure to access the network.

In some cases, UE may monitor signals from multiple BWPs including both active BWPs or inactive BPWs. In some cases, UE may be configured multiple active BWPs in a certain time window. In those cases, UE may estimate link quality of a BWP to be switched. This UE may be configured to transmit a signal quality indicator of BWP 0 before it switches from for example, BWP 1 after the timer expires. In this example, the UE may transmit such an indicator in the current active BWP, for example, BWP 1, while the base station may respond to the indicator in the BWP to which the UE is to be switched, for example, BWP 0.

Figure 6:
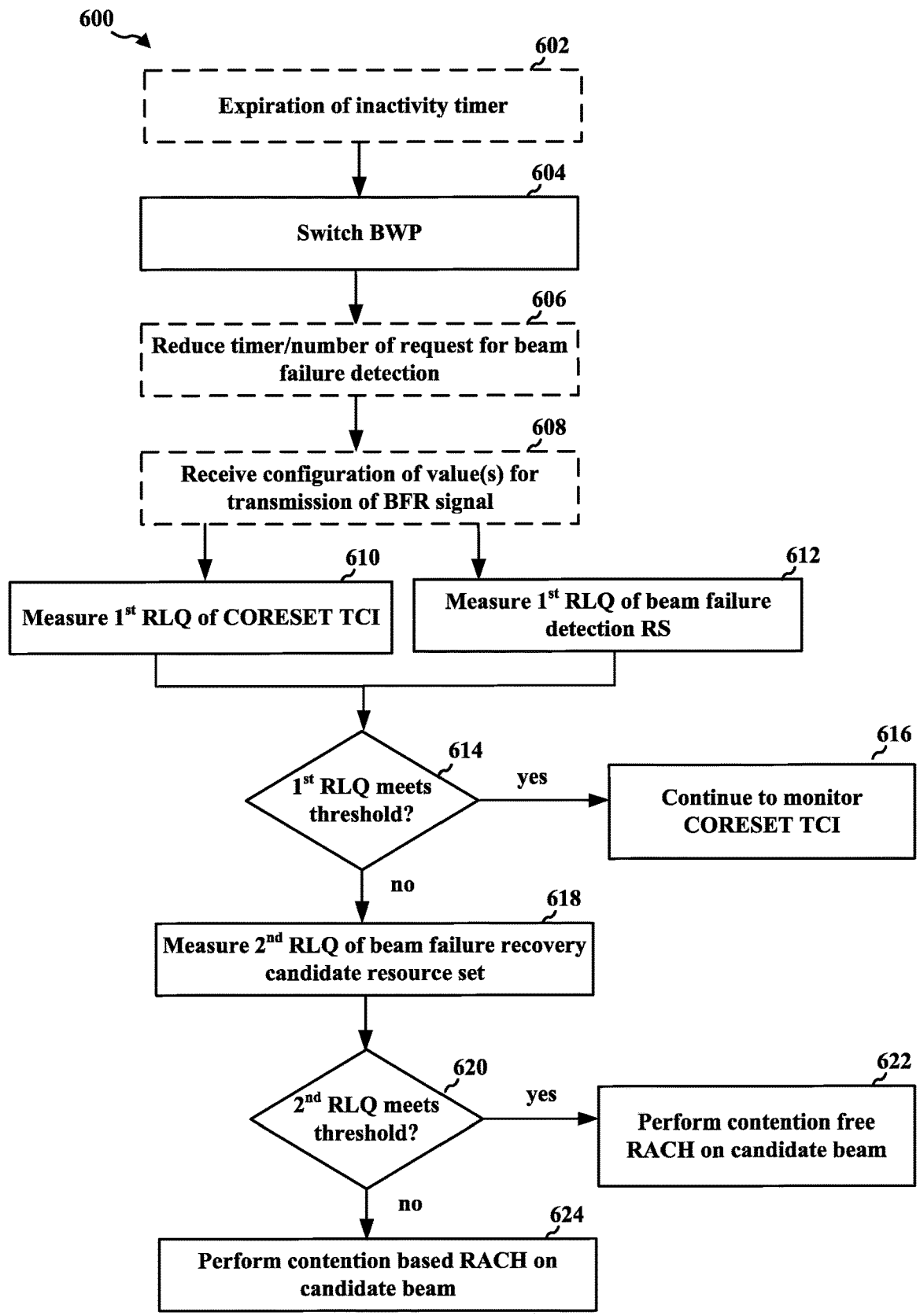
FIG. 6 is a flowchart of a method of wireless communication.

FIG. 6 is a flowchart 600 of a method of wireless communication. The method may be performed by a UE (e.g., UE 104, 350, 404, the apparatus 702, 702') communicating with base station 504 (e.g., base station 102, 180, 310, 402, 750). The communication may comprise 5G/NR mmW based communication, as described in connection with FIG. 4. Optional aspects are illustrated with a dashed line. The method improve the efficiency and accuracy of communication between the UE and the base station when the UE switches between BWPs.

At 604, the UE switches from a first, active BWP to a second, active BWP. The switch may be a fallback to a previously active BWP. For example, the first BWP may comprise BWP 1 and the second BWP may comprise BWP 0, as described in connection with FIG. 5. Thus, in one example, the UE may have previously switched from the second BWP (e.g., BWP 0) to the first BWP (BWP 1) in response to an instruction from the base station. The switch or fallback at 604 may be performed based on the expiration of a BWP inactivity timer that is detected by the UE at 602. The timer may be configured by the base station, and expiration of the timer may lead the UE to autonomously fall back to a default BWP or to a BWP specified by the base station, e.g., through RRC signaling. In another example, the switching at 604 may be in response RRC signaling and/or a control channel from a base station to cause the UE to switch BWPs from one to another.

Upon switching to the second, active BWP (e.g., BWP 0) at 604, the UE measures a first RLQ of a configured CORESET TCI at 610 or measures a first RLQ of a beam failure detection RS resource at 612.

At 614, the UE determines based on a first threshold RLQ whether to perform a measurement of a second RLQ of a beam failure recovery candidate resource set or to continue to monitor the configured CORESET TCI in the second, active BWP.

At 616, the UE continues to monitor the configured CORESET TCI in the second, active BWP when the first RLQ of the configured CORESET TCI or the beam failure detection RS meets the first threshold RLQ.

At 618, the UE performs the measurement of the second RLQ of the beam failure recovery candidate resource set when the first RLQ of the configured CORESET TCI or the beam failure detection RS does not meet the first threshold radio link quality.

At 620, the UE determines whether to perform a contention free random access procedure on a candidate beam or a contention based random access procedure on the candidate beam based on whether the measurement of the second RLQ of the beam failure recovery candidate resource set meets a second threshold. The second threshold may be configured by the network.

At 622, the UE performs the contention free random access procedure on the candidate beam when the second radio link quality meets the threshold. The contention free random access may include aspects as described in connection with the example in FIG. 9B. For example, the UE may initiate the random access by transmitting a first random access message comprising a preamble that is based on UE dedicated resources in sequence, time, and/or frequency.

At 624, the UE performs the contention based random access on the candidate beam when the second radio link quality does not meet the threshold. The contention based random access may include aspects as described in connection with the example in FIG. 9B.

At 606, the UE may change at least one of a timer or a number of requests in a beam failure detection based on the switching to the second, active BWP (e.g., BWP 0). The change may comprise reducing or disabling metrics relating to the timer and/or the number of requests. This may reduce the amount of time for the UE to recover a link with the base station.

At 608, the UE may also receive a configuration from the base station of at least one value for transmission of a beam failure recovery signal or for the transmission of another signal indicating a change of a preferred link to a base station.

Figure 7:
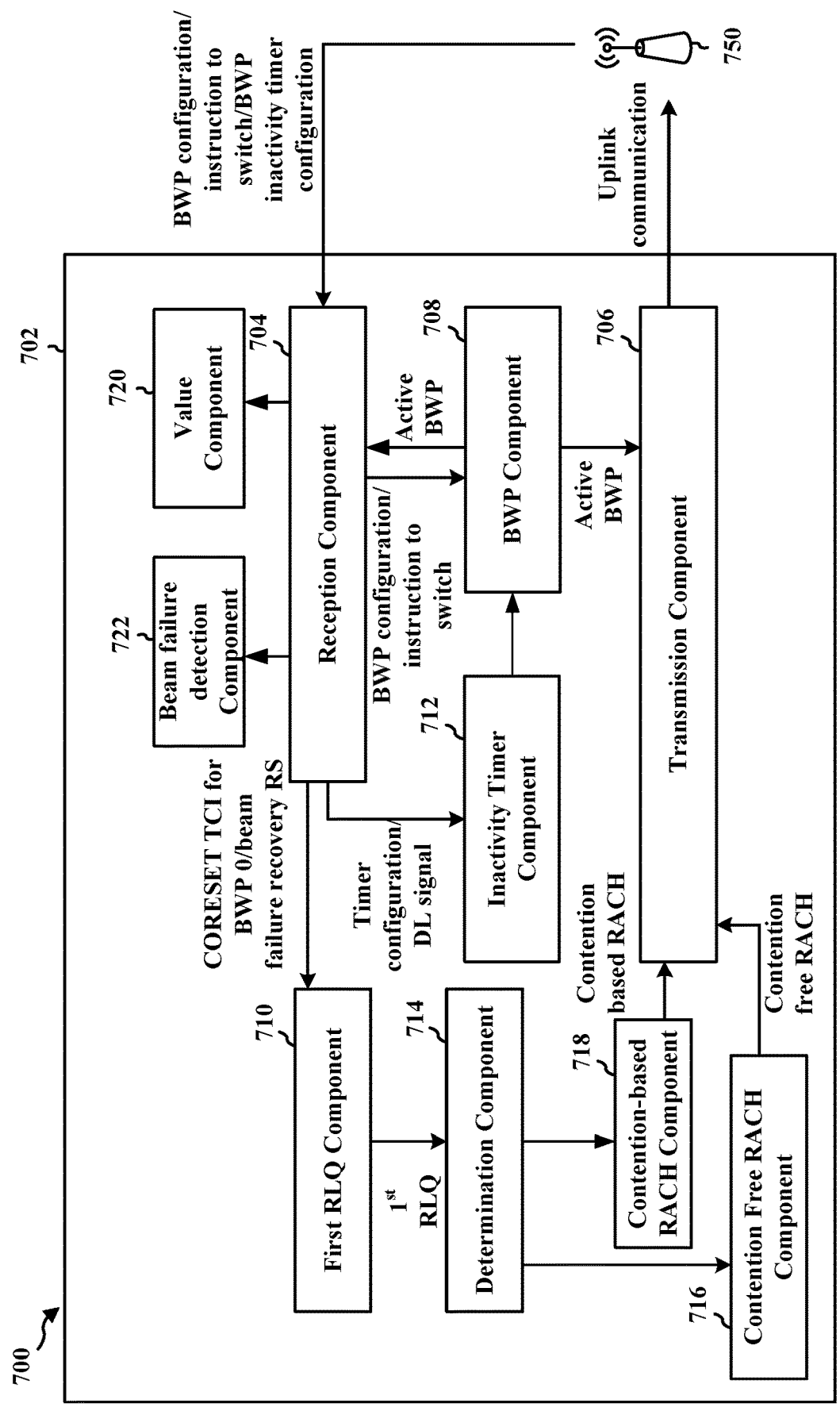
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE (e.g., UE 104, 350, 404, 502). The apparatus includes a reception component 704 that receives downlink communication from base station 750 (e.g., base station 102, 180, 310, 402, 504) and a transmission component that transmits uplink communication to the base station. The apparatus includes a BWP component 708 configured to switch from a first, active BWP to a second, active BWP, e.g., upon expiration of a BWP inactivity timer. Thus, the apparatus may include a BWP inactivity timer component 712 configured to detect an expiration of a BWP inactivity timer. The apparatus includes a first RLQ component 710 configured to measure a first radio link quality of a configured CORESET TCI or a beam failure detection RS upon switching to the second, active BWP. The apparatus includes a determination component 714 configured to determine based on a threshold radio link quality whether to perform a measurement of a second radio link quality of a beam failure recovery candidate resource set or to continue to monitor the configured CORESET TCI in the second, active BWP. The apparatus may include a contention free RACH component 716 configured to perform a contention free random access procedure on the candidate beam when the second radio link quality meets the threshold. The apparatus may include a contention-based RACH component 718 configured to perform contention based random access on the candidate beam when the second radio link quality does not meet the threshold. The apparatus may include a value component 720 receiving a configuration of at least one value for transmission of a beam failure recovery signal. The apparatus may include a beam failure detection component 722 configured to reduce at least one of a timer or a number of requests in a beam failure detection based on the switching to the second, active BWP.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
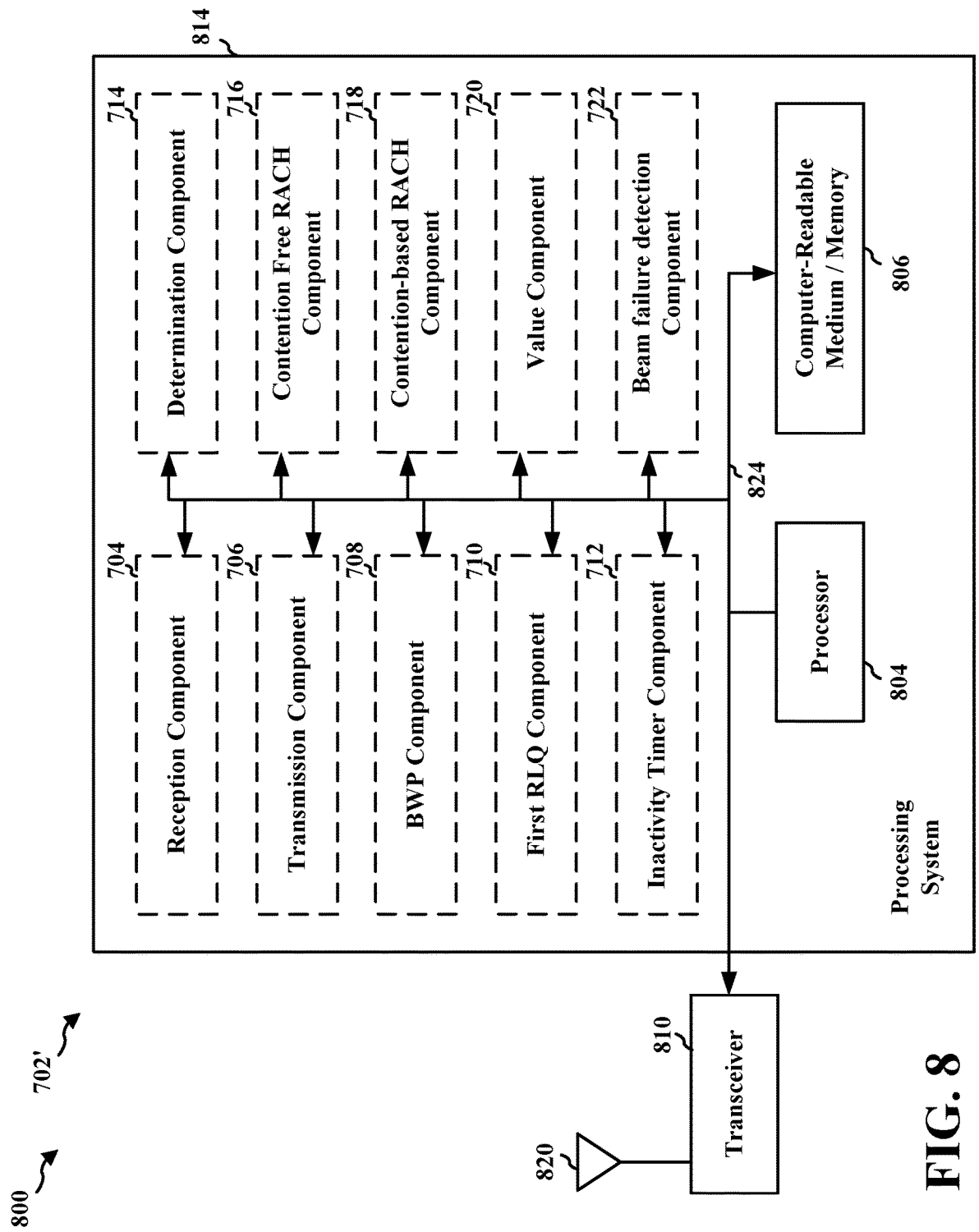
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720, 722, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720, 722. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for means for switching from a first, active BWP a second, active BWP; means for measuring a first radio link quality of a configured CORESET TCI or a beam failure detection RS upon switching to the second, active BWP; means for detecting an expiration of a BWP inactivity timer; means for determining based on a threshold radio link quality whether to perform a measurement of a second radio link quality of a beam failure recovery candidate resource set or to continue to monitor the configured CORESET TCI in the second, active BWP; means for determining whether to perform a contention free random access procedure on a candidate beam or a contention based random access procedure on the candidate beam based on whether the measurement of the second radio link quality of the beam failure recovery candidate resource set meets a second threshold; means for performing the contention free random access procedure on the candidate beam when the second radio link quality meets the threshold; and means for performing the contention based random access on the candidate beam when the second radio link quality does not meet the threshold; means for receiving a configuration of at least one value for transmission of a beam failure recovery signal; means for reducing at least one of a timer or a number of requests in a beam failure detection based on the switching to the second, active BWP. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

A UE may use a random access procedure in order to communicate with a base station. For example, the UE may use the random access procedure to request an RRC connection, to re-establish an RRC connection, resume an RRC connection, etc. Random Access Procedures may include two different random access procedures, e.g., Contention Based Random Access (CBRA) and Contention Free Random Access (CFRA). CBRA may be performed when a UE is not synchronized with a base station. CFRA may be applied, e.g., when the UE was previously synchronized to a base station. Both the procedures include transmission of a random access preamble from the UE to the base station.

In CBRA, a UE may randomly select a random access preamble sequence, e.g., from a set of preamble sequences. As the UE randomly selects the preamble sequence, the base station may receive another preamble from a different UE at the same time. Thus, CBRA provides for the base station to resolve such contention among multiple UEs. In CFRA, the network may allocate a preamble sequence to the UE rather than the UE randomly selecting a preamble sequence. This may help to avoid potential collisions with a preamble from another UE using the same sequence. Thus, CFRA is referred to as "contention free" random access. In order to initiate a CFRA, the UE may need to be in a connected mode, such as in a handover situation.

FIG. 9A illustrates an example 900 of CBRA between a UE 902 and base station 904. The UE 902 may initiate the message exchange by sending, to the base station 904, a first random access message 903 (e.g., Msg 1) including a preamble. The UE may obtain random access parameters, e.g., including preamble format parameters, time and frequency resources, parameters for determining root sequences and/or cyclic shifts for a random access preamble, etc., e.g., in system information from the base station. The preamble may be transmitted with an identifier, such as a Random Access RNTI (RA-RNTI). The base station responds to the first random access message by sending a second random access message 905 (e.g. Msg 2) including a random access response (RAR). The base station may use PDCCH for scheduling the UE and PDSCH for transmitting Msg 2 within a RAR window of time. Msg 2 may include, e.g., an identifier of the random access preamble sent by the UE, a time advance (TA), an uplink grant for the UE to transmit data, cell radio network temporary identifier (C-RNTI) or other identifier, and/or a back-off indicator. Upon receiving the RAR 905, the UE transmits a third random access message 907 (e.g., Msg 3) to the base station, e.g., using PUSCH, that may include a RRC connection request, an RRC connection re-establishment request, or an RRC connection resume request, depending on the trigger for the initiating the random access procedure. The base station then completes the four-step random access procedure by sending a fourth random access message 909 (e.g., Msg 4) to the UE, e.g., using PDCCH for scheduling and PDSCH for the message. The fourth random access message 909 may include a random access response message that includes timing advancement information, contention resolution information, and/or RRC connection setup information. The UE ma monitor for PDCCH, e.g., with the C-RNTI. If the PDCCH is successfully decoded, the UE may also decode PDSCH. The UE may send HARQ feedback for any data carried in the fourth random access message. If two UEs sent a same preamble at 903, both UEs may receive the RAR leading both UEs to send a third random access message 907. The base station may resolve such a collision by being able to decode the third random access message from only one of the UEs and responding with a fourth random access message to that UE. The other UE, which did not receive the fourth random access message 909, may determine that random access did not succeed and may re-attempt random access. Thus, the fourth message may be referred to as a contention resolution message. The fourth random access message 909 completes the random access procedure. Thus, the UE may transmit uplink communication 911 and/or receive downlink communication 913 based on the RAR 909.

FIG. 9B illustrates an example 901 of CFRA between a UE 906 and base station 908. In CFRA, the preamble is based on resources that are dedicated to the UE, e.g., dedicated resources of a preamble sequence, time resources and/or frequency resources, e.g., as provided to the UE at 915. Thus, the UE may initiate the random access procedure by sending, to the base station 908, a first random access message 917 (e.g., Msg 1) including a preamble using the dedicated resources. The base station responds to the first random access message by sending a second random access message 919 (e.g. Msg 2) including a random access response (RAR), similar to 905. Msg 2 may include, e.g., an identifier of the random access preamble, a time advance (TA), an uplink grant for the UE to transmit data, cell radio network temporary identifier (C-RNTI), and/or a back-off indicator. As the preamble is based on dedicated resources, the base station does not need to perform contention resolution, as with 907, 909 in FIG. 9A. The second random access message 919 completes the random access procedure. Thus, the UE may transmit uplink communication 921 and/or receive downlink communication 923 based on the RAR 919.

In communication involving beamforming, the UE may need to select a beam for performing the random access procedure, e.g., as described in connection with 523, 525 in FIG. 5.

The following examples are illustrative only and may be combined with aspects of other embodiments or teachings described herein, without limitation.

Example 1 is a method of wireless communication at a UE that includes switching from a first, active Bandwidth Part (BWP) to a second, active BWP and measuring a first radio link quality of a configured Control-resource set (CORESET) Transmission Configuration Indicator (TCI) or a beam failure detection Reference Signal (RS) upon switching to the second, active BWP.

In Example 2, the UE of example 1 further includes detecting an expiration of a BWP inactivity timer, wherein the UE switches from the first, active BWP to the second, active BWP in response to the detecting the expiration of the BWP inactivity timer.

In Example 3, the method of any of examples 1-2 further includes determining based on a threshold radio link quality whether to perform a measurement of a second radio link quality of a beam failure recovery candidate resource set or to continue to monitor the configured CORESET TCI in the second, active BWP.

In Example 4, the method of any of examples 1-3 further includes the UE continuing to monitor the configured CORESET TCI in the second, active BWP when the first radio link quality of the configured CORESET TCI or the beam failure detection RS meets the threshold radio link quality.

In Example 5, the method of any of examples 1-4 further includes the UE performing the measurement of the second radio link quality of the beam failure recovery candidate resource set when the first radio link quality of the configured CORESET TCI or the beam failure detection RS does not meet the threshold radio link quality.

In Example 6, the method of any of examples 1-5 further includes determining whether to perform a contention free random access procedure on a candidate beam or a contention based random access procedure on the candidate beam based on whether the measurement of the second radio link quality of the beam failure recovery candidate resource set meets a second threshold.

In Example 7, the method of any of examples 1-6 further includes the second threshold being configured by a network.

In Example 8, the method of any of examples 1-7 further includes performing the contention free random access procedure on the candidate beam when the second radio link quality meets the threshold.

In Example 9, the method of any of examples 1-8 further includes performing the contention based random access on the candidate beam when the second radio link quality does not meet the threshold.

In Example 10, the method of any of examples 1-9 further includes receiving a configuration of at least one value for transmission of a beam failure recovery signal or for the transmission of another signal indicating a change of a preferred link to a base station.

In Example 11, the method of any of examples 1-10 further includes changing at least one of a timer or a number of requests in a beam failure detection based on the switching to the second, active BWP.

In Example 12, the method of any of examples 1-11 further includes that the changing the at least one of the timer or the number of requests comprises reducing or disabling metrics relating to the at least one of the timer or the number of requests.

Example 13 is a system or apparatus including means for implementing a method or realizing an apparatus as in any of examples 1-12.

Example 14 is a non-transitory computer readable medium storing instructions executable by one or more processors to cause the one or more processors to implement a method as in any of examples 1-12.

Example 15 is a system including one or more processors and memory in electronic communication with the one or more processors storing instructions executable by the one or more processors to cause the system or apparatus to implement a method as in any of examples 1-12.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), the method comprising:
   detecting an expiration of a BWP inactivity timer;
   switching from a first, active Bandwidth Part (BWP) to a second, active BWP, wherein the UE autonomously switches from the first, active BWP to the second, active BWP in response to the detecting the expiration of the BWP inactivity timer, the second BWP comprises a previously active BWP, and wherein switching comprises falling back from the first BWP to the second BWP;
   reducing at least one of a timer or a number of requests in a beam failure detection based on the falling back to the second, active BWP;
   measuring a first radio link quality of a configured Control-resource set (CORESET) Transmission Configuration Indicator (TCI) or a beam failure detection Reference Signal (RS) upon switching to the second, active BWP; and
   determining, based on a threshold radio link quality and the switching, whether to perform a measurement of a second radio link quality of a beam failure recovery candidate resource set or to continue to monitor the configured CORESET TCI in the second, active BWP, wherein determining whether to perform the measurement of the second radio link quality comprises determining based on beam failure detection based on the timer or the number of requests.

2. The method of claim 1, wherein one or more of:
   the detecting the expiration of a BWP inactivity timer comprises detecting a time interval without communication from the base station on the second, active BWP.

3. The method of claim 1, wherein the UE continues to monitor the configured CORESET TCI in the second, active BWP when the first radio link quality of the configured CORESET TCI or the beam failure detection RS meets the threshold radio link quality.

4. The method of claim 1, wherein the UE performs the measurement of the second radio link quality of the beam failure recovery candidate resource set when the first radio link quality of the configured CORESET TCI or the beam failure detection RS does not meet the threshold radio link quality.

5. The method of claim 4, wherein the UE determines whether to perform a contention free random access procedure on a candidate beam or a contention based random access procedure on the candidate beam based on whether the measurement of the second radio link quality of the beam failure recovery candidate resource set meets a second threshold.

6. The method of claim 5, wherein the second threshold is configured by a network.

7. The method of claim 5, wherein the UE performs the contention free random access procedure on the candidate beam when the second radio link quality meets the second threshold.

8. The method of claim 5, wherein the UE performs the contention based random access procedure on the candidate beam when the second radio link quality does not meet the second threshold.

9. The method of claim 1, further comprising:
receiving a configuration of at least one value for transmission of a beam failure recovery signal or for transmission of another signal indicating a change of a preferred link to a base station.

10. An apparatus for wireless communication at a User Equipment (UE), comprising:
means for detecting an expiration of a BWP inactivity timer;
means for switching from a first, active Bandwidth Part (BWP) to a second, active BWP, wherein the UE autonomously switches from the first, active BWP to the second, active BWP in response to the detecting the expiration of the BWP inactivity timer, the second BWP comprises a previously active BWP, and wherein switching comprises falling back from the first BWP to the second BWP;
means for reducing at least one of a timer or a number of requests in a beam failure detection based on the falling back to the second, active BWP;
means for measuring a first radio link quality of a configured Control-resource set (CORESET) Transmission Configuration Indicator (TCI) or a beam failure detection Reference Signal (RS) upon switching to the second, active BWP; and
means for determining, based on a threshold radio link quality and the switching, whether to perform a measurement of a second radio link quality of a beam failure recovery candidate resource set or to continue to monitor the configured CORESET TCI in the second, active BWP wherein determining whether to perform the measurement of the second radio link quality comprises determining based on beam failure detection based on the timer or the number of requests changed based on the switching.

11. The apparatus of claim 10, wherein one or more of: the detecting the expiration of a BWP inactivity timer comprises detecting a time interval without communication from the base station on the second, active BWP.

12. The apparatus of claim 10, wherein the means for measuring further perform the measurement of the second radio link quality of the beam failure recovery candidate resource set when the first radio link quality of the configured CORESET TCI or the beam failure detection RS does not meet the threshold radio link quality, the apparatus further comprising:
means for determining whether to perform a contention free random access procedure on a candidate beam or a contention based random access procedure on the candidate beam based on whether the measurement of the second radio link quality of the beam failure recovery candidate resource set meets a second threshold;
means for performing the contention free random access procedure on the candidate beam when the second radio link quality meets the second threshold; and
means for performing the contention based random access procedure on the candidate beam when the second radio link quality does not meet the second threshold.

13. The apparatus of claim 10, further comprising:
means for receiving a configuration of at least one value for transmission of a beam failure recovery signal.

14. An apparatus for wireless communication at a User Equipment (UE), comprising:
a memory; and
at least one processor coupled to the memory and configured to cause the UE to:
detect an expiration of a BWP inactivity timer;
switch from a first, active Bandwidth Part (BWP) to a second, active BWP, wherein the UE autonomously switches from the first, active BWP to the second, active BWP in response to the detecting the expiration of the BWP inactivity timer, the second BWP comprises a previously active BWP, and wherein switching comprises falling back from the first BWP to the second BWP;
reduce at least one of a timer or a number of requests in a beam failure detection based on the falling back to the second, active BWP;
measure a first radio link quality of a configured Control-resource set (CORESET) Transmission Configuration Indicator (TCI) or a beam failure detection Reference Signal (RS) upon switching to the second, active BWP; and
determine, based on a threshold radio link quality and the switching, whether to perform a measurement of a second radio link quality of a beam failure recovery candidate resource set or to continue to monitor the configured CORESET TCI in the second, active BWP, wherein determining whether to perform the measurement of the second radio link quality comprises determining based on beam failure detection based on the timer or the number of requests changed based on the switching.

15. The apparatus of claim 14, wherein one or more of: the detecting the expiration of a BWP inactivity timer comprises detecting a time interval without communication from the base station on the second, active BWP.

16. The apparatus of claim 14, wherein the UE continues to monitor the configured CORESET TCI in the second, active BWP when the first radio link quality of the configured CORESET TCI or the beam failure detection RS meets the threshold radio link quality.

17. The apparatus of claim 14, wherein the UE performs the measurement of the second radio link quality of the beam failure recovery candidate resource set when the first radio link quality of the configured CORESET TCI or the beam failure detection RS does not meet the threshold radio link quality.

18. The apparatus of claim 17, wherein the UE determines whether to perform a contention free random access procedure on a candidate beam or a contention based random access procedure on the candidate beam based on whether the measurement of the second radio link quality of the beam failure recovery candidate resource set meets a second threshold.

19. The apparatus of claim 18, wherein the at least one processor is further configured to:

perform the contention free random access procedure on the candidate beam when the second radio link quality meets the second threshold.

20. The apparatus of claim 18, wherein the at least one processor is further configured to:
perform the contention based random access procedure on the candidate beam when the second radio link quality does not meet the second threshold.

21. The apparatus of claim 14, wherein the at least one processor is further configured to:
receive a configuration of at least one value for transmission of a beam failure recovery signal or for transmission of another signal indicating a change of a preferred link to a base station.

22. A computer-readable medium storing computer executable code for wireless communication at a User Equipment (UE), comprising code to:
detect an expiration of a BWP inactivity timer;
switch from a first, active Bandwidth Part (BWP) to a second, active BWP, wherein the UE autonomously switches from the first, active BWP to the second, active BWP in response to the detecting the expiration of the BWP inactivity timer, the second BWP comprises a previously active BWP, and wherein switching comprises falling back from the first BWP to the second BWP;
reduce at least one of a timer or a number of requests in a beam failure detection based on the falling back to the second, active BWP;
measure a first radio link quality of a configured Control-resource set (CORESET) Transmission Configuration Indicator (TCI) or a beam failure detection Reference Signal (RS) upon switching to the second, active BWP; and
determine, based on a threshold radio link quality and the switching, whether to perform a measurement of a second radio link quality of a beam failure recovery candidate resource set or to continue to monitor the configured CORESET TCI in the second, active BWP, wherein determining whether to perform the measurement of the second radio link quality comprises determining based on beam failure detection based on the timer or the number of requests changed based on the switching.

23. The computer-readable medium of claim 22, wherein one or more of:
the detecting the expiration of a BWP inactivity timer comprises detecting a time interval without communication from the base station on the second, active BWP.

24. The computer-readable medium of claim 22, further comprising code to:
perform the measurement of the second radio link quality of the beam failure recovery candidate resource set when the first radio link quality of the configured CORESET TCI or the beam failure detection RS does not meet the threshold radio link quality; and
perform a contention free random access procedure on a candidate beam or a contention based random access procedure on the candidate beam based on whether the measurement of the second radio link quality of the beam failure recovery candidate resource set meets a second threshold.

25. The computer-readable medium of claim 24, further comprising code to:
perform the contention free random access procedure on the candidate beam when the second radio link quality meets the second threshold; and
perform the contention based random access procedure on the candidate beam when the second radio link quality does not meet the second threshold.

* * * * *